United States Patent
Liegeois et al.

(10) Patent No.: US 11,014,653 B2
(45) Date of Patent: May 25, 2021

(54) METHOD FOR SECURING AN AIRCRAFT WHEEL DRIVE ACTUATOR IN AN OPEN POSITION

(71) Applicants: Pierre-Yves Liegeois, Moissy-Cramayel (FR); Bruno Thoraval, Moissy-Cramayel (FR)

(72) Inventors: Pierre-Yves Liegeois, Moissy-Cramayel (FR); Bruno Thoraval, Moissy-Cramayel (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 0 days.

(21) Appl. No.: 16/682,939

(22) Filed: Nov. 13, 2019

(65) Prior Publication Data

US 2020/0148339 A1 May 14, 2020

(30) Foreign Application Priority Data

Nov. 14, 2018 (FR) ....................... 1860506

(51) Int. Cl.
*B64C 25/26* (2006.01)
*B64C 25/22* (2006.01)
*F15B 15/26* (2006.01)

(52) U.S. Cl.
CPC ............. *B64C 25/26* (2013.01); *B64C 25/22* (2013.01); *F15B 15/26* (2013.01); *F15B 2015/268* (2013.01); *F15B 2211/72* (2013.01)

(58) Field of Classification Search
CPC ......... B64C 25/26; B64C 25/22; F15B 15/26; F15B 2015/268; F15B 2211/72
See application file for complete search history.

(56) References Cited

U.S. PATENT DOCUMENTS

| 3,762,670 | A | 10/1973 | Chillson |
| 9,422,052 | B2 * | 8/2016 | Kondo ................. B64C 13/504 |
| 2015/0151833 | A1 | 6/2015 | Cox |
| 2016/0039519 | A1 * | 2/2016 | Di Dey .................... F16H 1/06 244/103 S |

FOREIGN PATENT DOCUMENTS

| EP | 2 982 603 A1 | 2/2016 |
| EP | 3 222 521 A1 | 9/2017 |
| WO | 2015/040364 A1 | 3/2015 |

OTHER PUBLICATIONS

French Search Report dated Jul. 15, 2019, for French Application No. 1860506, filed Nov. 14, 2018, 2 pages.

* cited by examiner

*Primary Examiner* — Abiy Teka
(74) *Attorney, Agent, or Firm* — Christensen O'Connor Johnson Kindness PLLC

(57) ABSTRACT

A method for securing an aircraft landing gear wheel drive actuator in an open position of the wheel, the drive actuator being movably mounted on the landing gear between said open position in which it is remote from the wheel and an engaged position in which it cooperates with the wheel to ensure its rotational drive, a displacement actuator being coupled to the drive actuator to move same between the two positions, and a locking member being provided to lock the drive actuator in the open position. The method includes holding the controlled displacement actuator to move the drive actuator to the open position, while the drive actuator is locked in the open position.

5 Claims, 1 Drawing Sheet

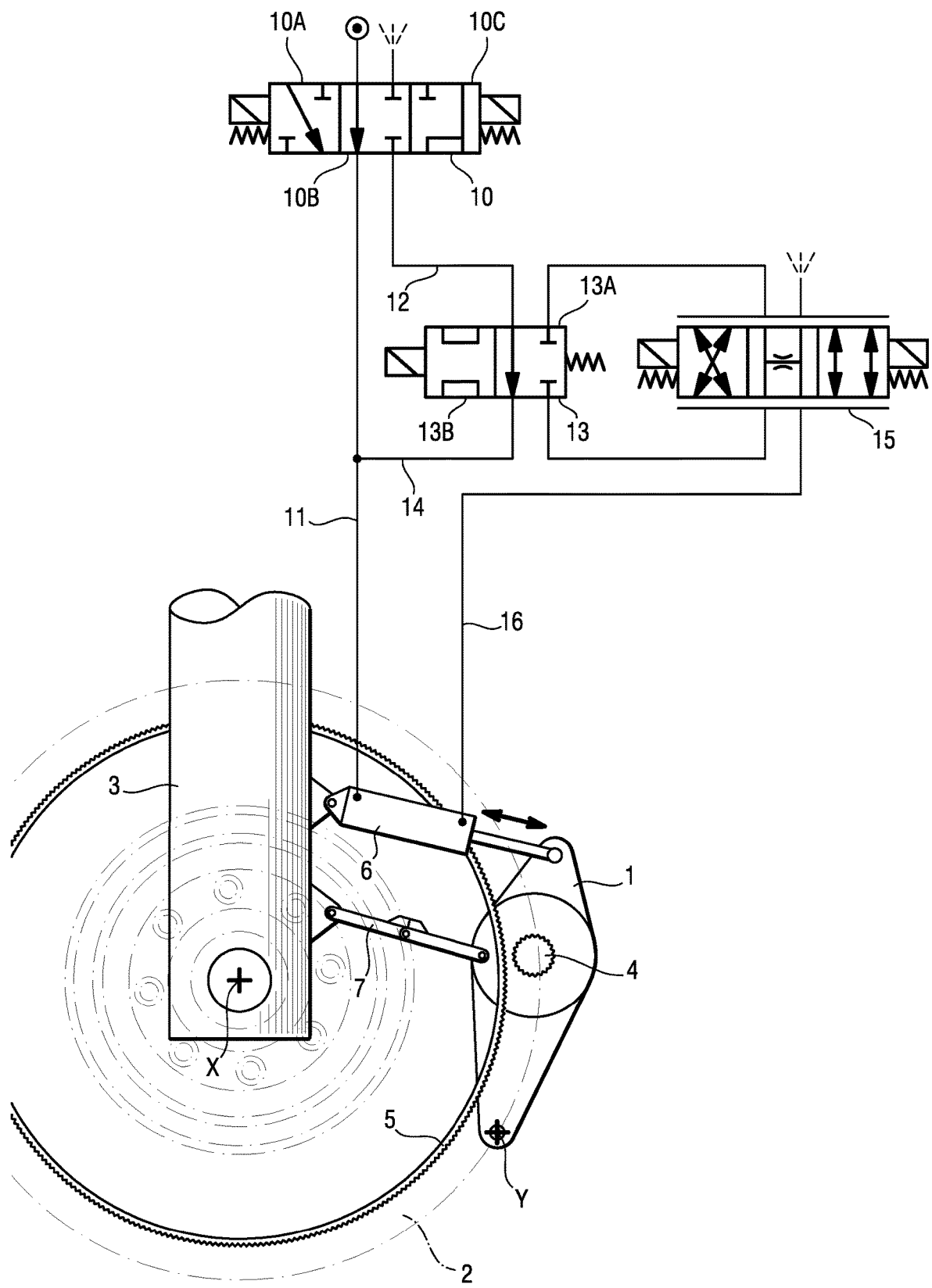

METHOD FOR SECURING AN AIRCRAFT WHEEL DRIVE ACTUATOR IN AN OPEN POSITION

CROSS-REFERENCE TO RELATED APPLICATION

This application claims priority to French Patent Application No. 1860506, filed Nov. 14, 2018, the entirety of which is hereby incorporated by reference.

TECHNICAL FIELD

The present disclosure relates to methods for securing an aircraft wheel drive actuator in an open position.

BACKGROUND

Aircraft landing gears carry wheels equipped with a rotating drive actuator. For safety reasons, it is required that, particularly in the takeoff or landing phases, the drive actuator cannot interfere with the wheel. Some of these drive actuators are thus mounted so that they can be moved on the landing gear between an engaged position in which the drive actuator is likely to drive the wheel, and an open position in which the drive actuator is away from the wheel and does not cooperate with it. For example, the drive actuator is pivotally mounted on the landing gear and is moved between the engaged position and the open position by a linear displacement actuator, such as a cylinder. A locking device is used to keep the drive actuator in an open position during the phases when it is prevented from interfering with the wheel. However, the locking element can still fail, which is a major safety issue.

SUMMARY

In an aspect, a method is proposed for securing an aircraft landing gear wheel drive actuator in an open position of the wheel, the drive actuator being movably mounted on the landing gear between an open position in which it does not cooperate with the wheel and an engaged position in which it cooperates with the wheel to ensure its rotational drive, a displacement actuator being coupled to the drive actuator to move same between the two positions, and a locking member being provided to lock the drive actuator in the open position. The method in an embodiment includes the step of holding the controlled displacement actuator to move the drive actuator to the open position while the drive actuator is locked in the open position.

Thus, even in the event of a failure of the locking device, the drive actuator is held in an open position by the displacement actuator and therefore does approach the wheel to interfere with it.

In some embodiments, the method includes modifying the energy supply circuit of the displacement actuator so that it continues to be supplied (with current or pressurized fluid) while the drive actuator is locked in the open position.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein:

FIG. 1 is a hydraulic diagram of a representative supply circuit for a displacement cylinder of a drive actuator adapted to implement a method of the present disclosure.

DETAILED DESCRIPTION

With reference to the FIG. 1, a drive actuator 1 is adapted to rotate an aircraft wheel 2 mounted for rotation along an axis of rotation X at the bottom of an aircraft landing gear 3. The drive actuator 1 is mounted pivotably along a pivot axis Y parallel to the pivot axis X, to be movable between an open position shown in FIG. 1 in which a roller 4 of the drive actuator 1 is moved away from a drive track 5 integral with the wheel 2, and an engaged position in which the roller 4 of the drive actuator 1 is supported on the drive track 5 of the wheel 2, so that the drive actuator 1 can drive the wheel 2 in rotation. To do this, a double acting cylinder 6 is attached to the drive actuator 1 to move it between the two positions and also to modulate the support force of the roller 4 against the drive track 5 when the drive actuator 1 is in the engaged position. A locking member 7 locks the drive actuator 1 in the open position when it is not used to move the aircraft, particularly during takeoff or landing phases.

According to a representative method of the present disclosure, the cylinder 6 is kept powered to move the drive actuator 1 to the open position when the drive actuator is locked in the open position, in order to provide additional safety to overcome a failure of the locking member 7 and hold the drive actuator in the open position.

To do this, and in accordance with a representative embodiment of the present disclosure, the supply and control circuit of the cylinder 6 first comprises a three position selector 10 with a pressure port (round symbol) and a return port (fan symbol), and two service ports connected to a supply line 11 of the plenum chamber of the cylinder 6, and a supply line 12 of a mode valve 13 as detailed below. The selector 10 has a stable rest position 10B in which it connects the supply line 11 of the plenum chamber of the cylinder 6 through pressure, which has the effect of holding the cylinder 6 controlled in extension, and thus moving the drive actuator 1 to the open position. The selector 10 can be electrically controlled to be placed in a depressurization position 10C in which the two supply lines 11, 12 are connected to the return. The selector 10 can also be electrically controlled to be placed in an operating position 10A in which the supply line 12 is connected to pressure, which therefore arrives at the inlet of the mode valve 13.

The mode valve 13 has two positions, including a rest position 13A in which pressure supplied by the supply line 12 is redirected to the supply line 11 of the cylinder 6 by a bypass 14, and an electrically controlled activation position 13B, in which pressure is supplied to the pressure inlet of a servo valve 15, the other inlet of which is connected to the return. One of the outlets of the servo valve 15 is connected through the mode valve 13 to the bypass 14, and the other of the outlets is connected via a line 16 to the annular chamber of the cylinder 6. Thus, when the mode valve 13 is placed in the activation position 13B, the cylinder 6 can be controlled by the servo valve 15 to move the drive actuator 1 between the open position and the engaged position, and modulate the pressure exerted by the roller 4 on the track 5 when the drive actuator 1 is in the engaged position.

Thus, when the drive actuator 1 has been moved to the open position and locked in that position by the locking member 7, the return of the selector 10 to the stable rest position 10B maintains the power supply to the cylinder 6 in the direction of travel to the open position. This provision provides increased safety by preventing the drive actuator 1 from interfering with the wheel 2 in the event of failure of the locking member 7.

When the selector 10 is in the stable rest position, the servo valve 15 is disabled and any control of the servo valve 15 to actuate the cylinder 6 has no effect on it.

To enable the drive actuator 1 to move to the engaged position, the selector 10 is first moved to the operating position 10A, then, after disabling the locking member 7, the mode valve 13 is controlled to move it to the activation position 13B, allowing the cylinder 6 to be controlled by the servo valve 15.

It should be noted that when the selector 10 is placed in the depressurization position 10C, the two chambers of the cylinder 6 are then at the same pressure so that the cylinder 6 still returns the drive actuator 1 to the open position.

The present disclosure is not limited to what has just been described, but encompasses every alternative solution within the scope of the claims.

In particular, although the methods have been described in the context of a pivoting drive actuator moved by a hydraulic cylinder, the methods more generally apply to any displacement actuator movable between an engaged position and a position engaged and moved by a displacement actuator, whether linear or angular, hydraulic or electric, as long as the displacement actuator is held under control to move the drive actuator to the open position. In the case of an electric actuator, the selector 10 is no longer a valve but a switch, and the servo valve is replaced by a servo control member adapted to distribute electrical energy to the actuator in a progressive manner.

While illustrative embodiments have been illustrated and described, it will be appreciated that various changes can be made therein without departing from the spirit and scope of the claimed subject matter.

The embodiments of the invention in which an exclusive property or privilege is claimed are defined as follows:

1. A method for securing a rotating drive actuator of an aircraft landing gear wheel in an open position of the aircraft landing gear wheel, the drive actuator being movably mounted on a landing gear between said open position in which it is remote from the aircraft landing gear wheel and an engaged position in which it cooperates with the aircraft landing gear wheel to ensure its rotating drive, a displacement actuator being coupled to the drive actuator to move it between the open position and the engaged position, and a locking member being arranged to lock the drive actuator in the open position, the method comprising a step, while the drive actuator is locked in the open position, of holding the displacement actuator under control to move the drive actuator to the open position.

2. The method according to claim 1, wherein a hydraulic supply circuit for the displacement actuator is provided with a selector having a stable rest position in which the displacement actuator is controlled to move the drive actuator to the open position.

3. The method according to claim 2, wherein the selector has a controlled position for depressurizing the hydraulic supply circuit.

4. The method according to claim 2, wherein the selector has an operational controlled position in which the displacement actuator can be controlled by a servo control member.

5. The method according to claim 4, wherein the hydraulic supply circuit is equipped with a mode valve which is supplied with a supply pressure only if the selector is in the operational controlled position, and which has a stable rest position in which the supply pressure is redirected to the displacement actuator to move the drive actuator to the open position, and an activation position in which the supply pressure is supplied to the servo control member of the displacement actuator.

* * * * *